United States Patent
Janssen

(10) Patent No.: US 6,343,753 B1
(45) Date of Patent: Feb. 5, 2002

(54) RECYCLING DEVICE FOR CHIPS-CONTAINING COOLANTS AND LUBRICANTS

(75) Inventor: Mark Janssen, Beringem (BE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/367,096

(22) PCT Filed: Feb. 9, 1998

(86) PCT No.: PCT/EP98/00684

§ 371 Date: Jan. 11, 2000

§ 102(e) Date: Jan. 11, 2000

(87) PCT Pub. No.: WO98/34758

PCT Pub. Date: Aug. 13, 1998

(30) Foreign Application Priority Data

Feb. 10, 1997 (DE) .......................................... 197 04 859

(51) Int. Cl.⁷ ................................................ B02B 7/02
(52) U.S. Cl. ............................ 241/100; 241/73; 241/81; 241/97
(58) Field of Search ............................. 241/24, 100, 73, 241/81, 97, 69

(56) References Cited

U.S. PATENT DOCUMENTS 4,377,259 A * 3/1983 Areaux et al. ................. 241/73

FOREIGN PATENT DOCUMENTS

| EP | 518095 A | * 12/1992 |
| GB | 463242 A | * 3/1937 |
| JP | 8 238436 A | * 9/1996 |

* cited by examiner

Primary Examiner—Allen Ostrager
Assistant Examiner—William Hong
(74) Attorney, Agent, or Firm—Crowell & Moring LLP

(57) ABSTRACT

A separating device for coolants or lubricants, containing chips, is described. This is provided with a supply line (11), a container (10) as well as a pump (20), which is connected with the container (10). The pressure side of the pump is connected with a discharge line (28). The pump, in particular, is an unchokable pump. A device (13), for comminuting the chips supplied, is disposed in the container (10).

6 Claims, 2 Drawing Sheets

RECYCLING DEVICE FOR CHIPS-CONTAINING COOLANTS AND LUBRICANTS

BACKGROUND OF THE INVENTION

The invention relates to a separating device for coolants and lubricants, which contains chips, and consists of a container, into which a supply line empties, a pump being provided for discharging the materials supplied and transporting them further.

The German Offenlegungsschrift 195 01 921 discloses an apparatus for disposing of liquid media. This apparatus consists of a container, in which a partial vacuum is built up and which is connected with a further suction container. The liquid media are supplied to this container by the partial vacuum. Furthermore, a pump, which transports the liquid media further to a processing device, is disposed downstream from the container.

A disadvantage of the system can be seen therein that, when the partial vacuum is produced, air is discharged, which is contaminated with pollutants and which must, in turn, be purified appropriately. In addition, the danger exists that coarse chips will damage the pump.

The German Offenlegungsschrift 44 36 002 discloses a conveyor for liquid media, for which the coarse chips are supplied to comminuting equipment. Only then is the liquid with the residues transported further. For this purpose, however, an expensive system with a trough scraper is required, which requires much space and, moreover, is expensive to maintain.

It is an object of the invention to provide a separating device for coolants and lubricants containing chips, the separating device being of compact construction and making a reliable further transport possible.

This objective is accomplished by the distinguishing features of the main claim.

The essential advantage of the invention lies therein that, in the container of the separating device, a device for comminuting the chips supplied is disposed. Pursuant to an advantageous development of the invention, this device may consist of a single toothed roller. A sheet metal comb is assigned to this toothed roller, so that the chips, due to the rotational movement of the toothed roller, are sheared off at the sheet metal comb.

The motor, especially an electric motor, is disposed outside of the container. The toothed roller is driven by the motor over a chain or a toothed belt.

Pursuant to a development of the invention, a perforated metal sheet is disposed below the toothed roller. This perforated metal sheet functions as a safety filter element and has perforations of a size, selected so that the chips, passing through the perforations, can be transported harmlessly by the downstream pump.

In an advantageous development of the invention, the device for comminuting the chips supplied is constricted as a module. Depending on the particular application, this module can be disposed at the container or at a distance from the container. In addition, the possibility exists of optimizing the module in accordance with the structure or material properties of the chips supplied. In addition, in the event of a defect, the module can be exchanged quickly. If foreign parts, with which the comminuting device cannot cope, are added to the coolants and lubricants supplied, these particles are recognized by a current monitor, which switches the motor briefly into a reverse operation. If comminution of the foreign parts is not possible after the motor is reversed repeatedly, the possibility exists of removing these parts through an opening in the container.

An alternative separating device for coolants and lubricants, containing chips, provides, instead of a pump with an unchokable impeller, a self-priming pump. This has the advantage that it generates adequate pump pressure even when the liquid level is very low. The pump may be equipped with an appropriate monitoring device to prevent it running dry.

A very compact construction is obtained owing to the fact that the pump, as well as the device for comminuting the chips supplied, are disposed in the container. Of course, the possibility also exists of disposing the pump above the container and introducing only a suction pipe into the container.

These and further distinguishing features of preferred further developments of the invention are evident from the specification and drawings, as well as from the claims. The individual distinguishing features in each case are realized for themselves alone or, in the case of several, in the form of subcombinations for the embodiment of the invention and are realized in other fields. They can represent advantageous embodiments for themselves, which are capable of being protected, for which protection is claimed here:

BRIEF DESCRIPTION OF THE DRAWINGS

The invention is described in greater detail in the following by means of examples and a drawing, in which.

DETAILED DESCRIPTION OF THE PREFERRED EMBODIMENTS

Figure 1:
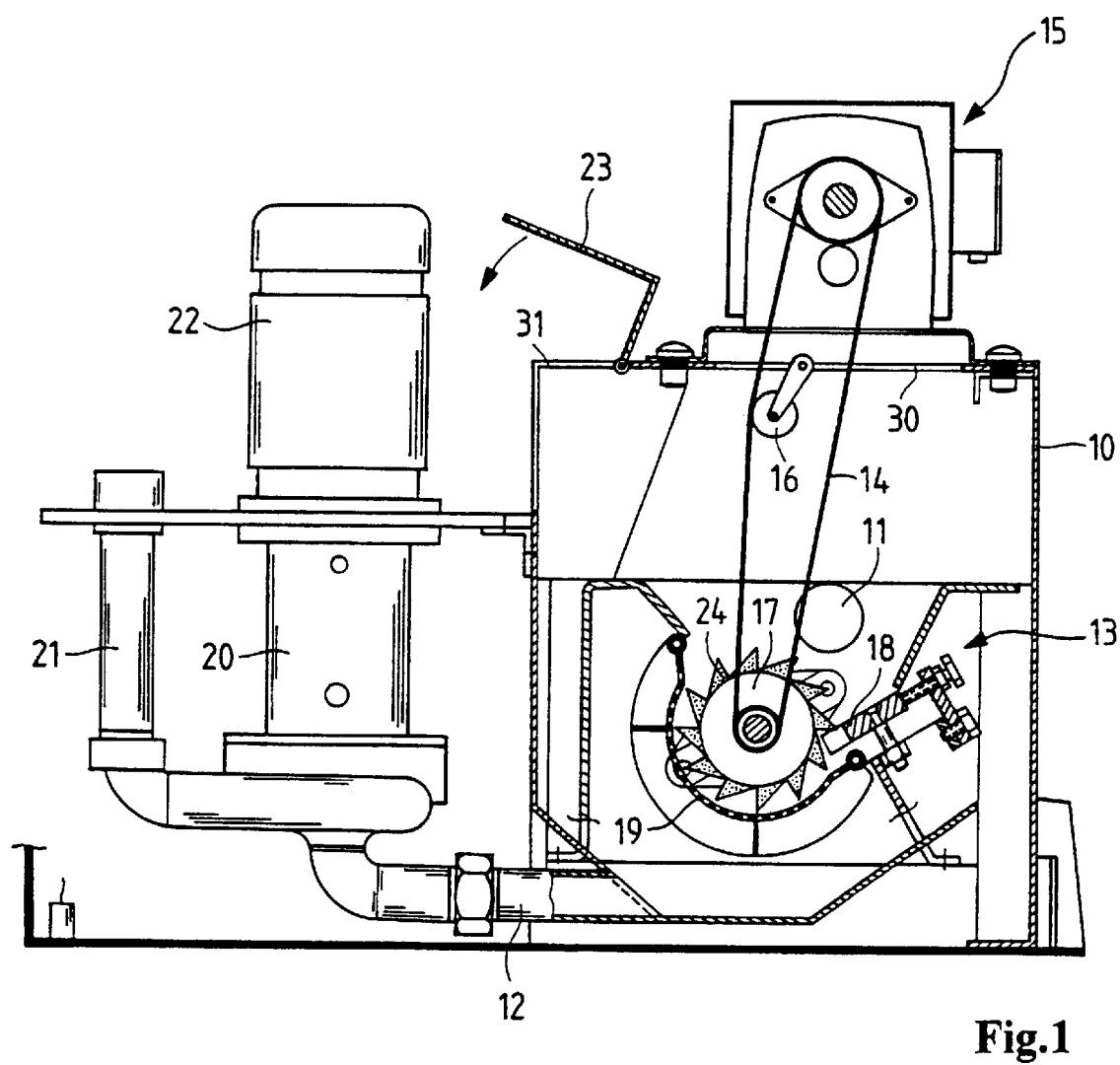
FIG. 1 shows a sectional representation of a separating device.

The separating device of FIG. 1 consists of a container 10, which is connected with a supply line 11, as well as with a discharging line 12. In the container 10, a device 13 for comminuting the chips supplied is provided. This device is driven over a driving chain 14 by an electric motor 15 fastened to the container. The electric motor has a step-down gear unit, the driving rpm of which is about 80 the driving chain 14 extends through an opening 30 and runs along a chain adjuster 16 and drives a roller 17, which has teeth at its periphery. The comminuting device 13 furthermore is provided with a sheet metal comb 18. Due to the rotation of the toothed roller, the chips, supplied to the container 10, are sheared between the teeth and the sheet metal comb. Below the roller 17, there is a perforated metal sheet 19. The adequately comminuted chips pass through the perforated metal sheet into the lower region of the container. The chips, which do not pass through the perforated metal sheet, are carried along upward once again by the toothed roller and comminuted once more. The coolants or lubricants, flowing over the supply line 11 into the container, as well as the comminuted chips, pass through the discharge line 12 and reach a pump 20. This pump has an unchokable impeller and conveys the materials, containing the chips, to an outlet line 21. The pump is driven by means of an electric motor 22.

A swiveling shutter 23 is provided at the container 10. It enables the comminuting equipment to be checked visually through an opening 31 and simplifies the maintenance of the components disposed in the container.

Figure 2:
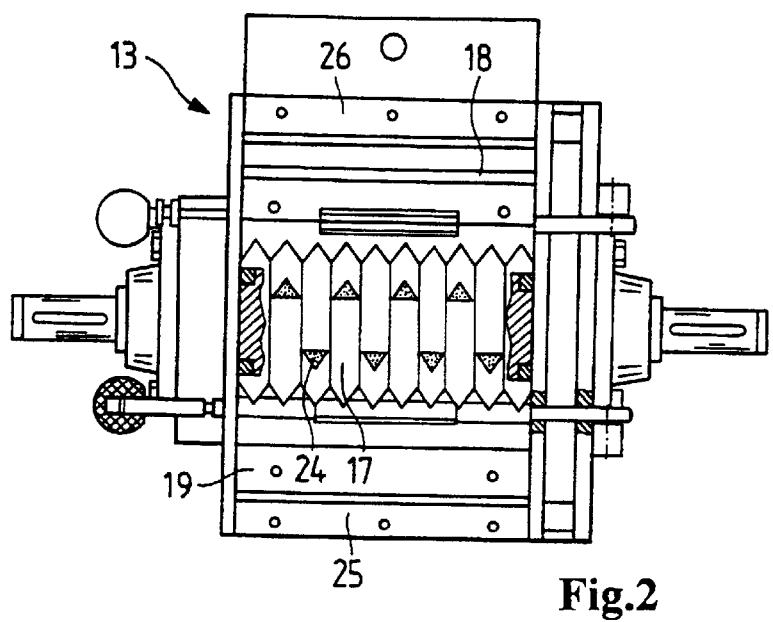
FIG. 2 shows a plan view of a device for comminuting chips supplied.

FIG. 2 shows a plan view of the comminuting equipment 13. As already mentioned the roller 17 is provided with teeth 24, which slide by the sheet metal comb 18 and bring about the shearing of the chips supplied. The perforated metal sheet 19 is disposed below the roller 17 and fixed laterally at the supports 25, 26.

Figure 3:
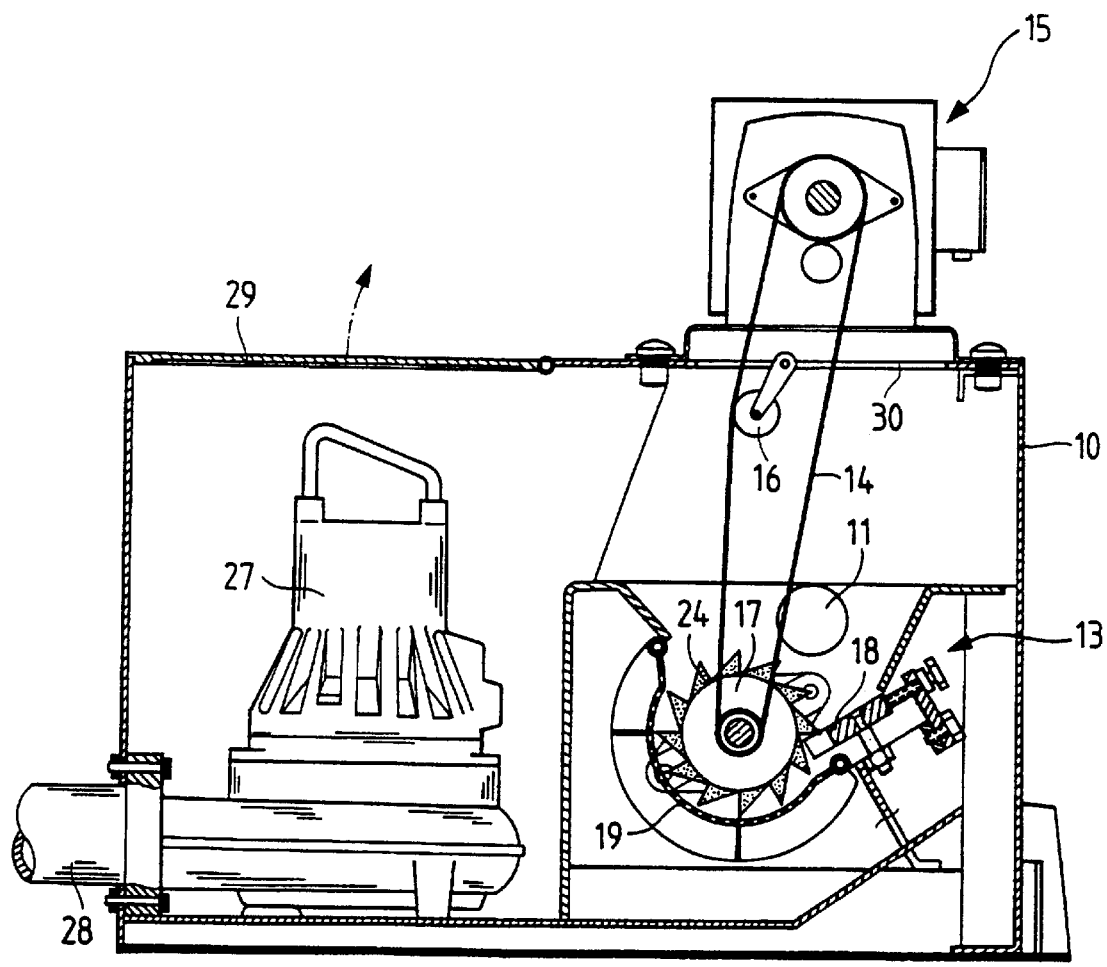
FIG. 3 shows a separating device with a self-priming pump.

FIG. 3 shows the variation of a container, identical parts being provided with the same reference numbers. A self-priming pump 27 is integrated in the container. The pump stands directly on the bottom of the container and pumps the aspirated liquid into an outlet line 28. For maintenance work, a lid 29, which is fastened to the container 10 with a hinge, can be opened. Of course, the possibility also exists of doing without the comminuting equipment 13 if the coolants or lubricants, while being worked up or transported, contain chips, which are already comminuted.

Since the comminuting equipment is constructed as a module, that is, since the electric motor 15 and the comminuting unit form a structural unit, the latter can be exchanged as required or, in the event that it is not needed, removed completely. A container, in which merely the self-priming pump is provided, is used to place the coolants or lubricants, supplied to the container, under pressure and supply them to purifying or filtering equipment.

List of Reference Symbols
10. container
11. supply line
12. discharge line
13. comminuting equipment
14. driving chain
15. electric motor
16. chain adjuster
17. roller
18. sheet metal comb
19. perforated metal sheet
20. pump
21. outlet line
22. electric motor
23. swiveling shutter
24. teeth
25. support
26. support
27. pump
28. outlet line
29. cover
30. opening
31. opening

What is claimed is:

1. A separating device for coolants or lubricants, containing chips, comprising a supply line, a container, as well as a pump which is disposed in the container and the pressure side of which is connected with an outlet line, the pump being an unchokable pump, and a device for comminuting the chips supplied being disposed in the container, wherein the device for comminuting the chips supplied is an exchangeable module and an opening for inserting the module is provided at the container, the container having an opening for maintenance purposes.

2. The separating device of claim 1, wherein the device for comminuting the chips supplied comprises a toothed roller which is driven by a motor which is disposed outside of the container and to which toothed roller a sheet metal comb is assigned.

3. The separating device of claim 2, wherein a perforated metal sheet is provided as a safety filter element below the toothed roller.

4. The separating device of claim 1, wherein the device for comminuting the chips supplied is equipped with a current monitor and, when the current exceeds a specified nominal value, the motor is reversed.

5. A separating device for coolants and lubricants containing chips, comprising at least one supply line, which discharges into a container, to which at least one pump is assigned, the pressure side of the pump being connected with a discharging line and the pump having an inlet opening close to the bottom of the container and being a self-priming pump, wherein the pump and a device for comminuting the supplied chips are both disposed in the container, and
wherein the device for comminuting the chips supplied is an exchangeable module and an opening for inserting the module is provided at the container, the container having an opening for maintenance purposes.

6. The separating device of claim 5, wherein the pump has a monitoring device, which prevents the pump running dry.

* * * * *